Figure 8:
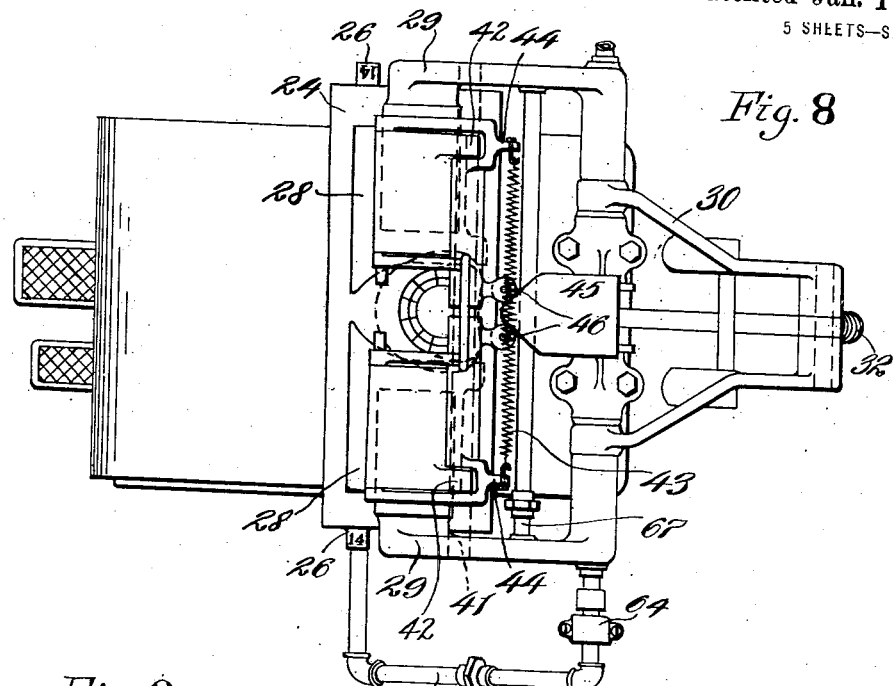

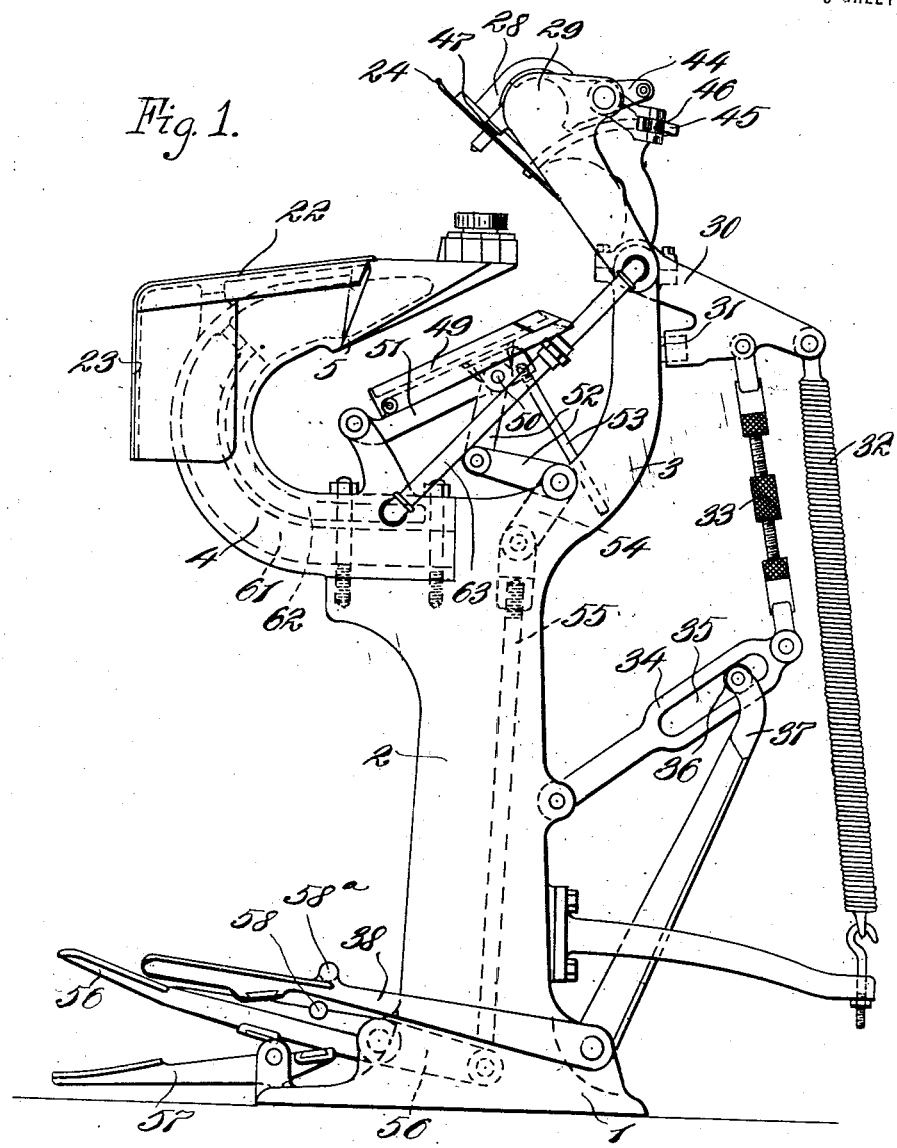

C. L. BRALEY.
SHIRT PRESSING MACHINE.
APPLICATION FILED DEC. 8, 1916.
1,403,838.
Patented Jan. 17, 1922.
5 SHEETS—SHEET 2.
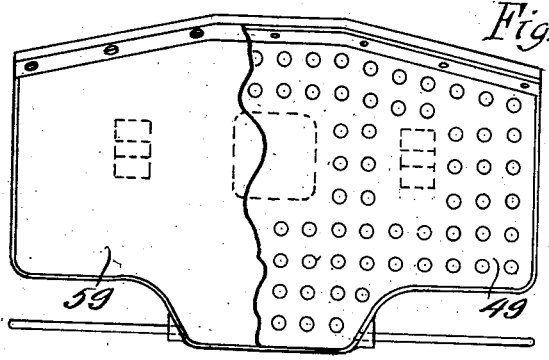
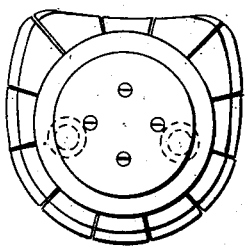
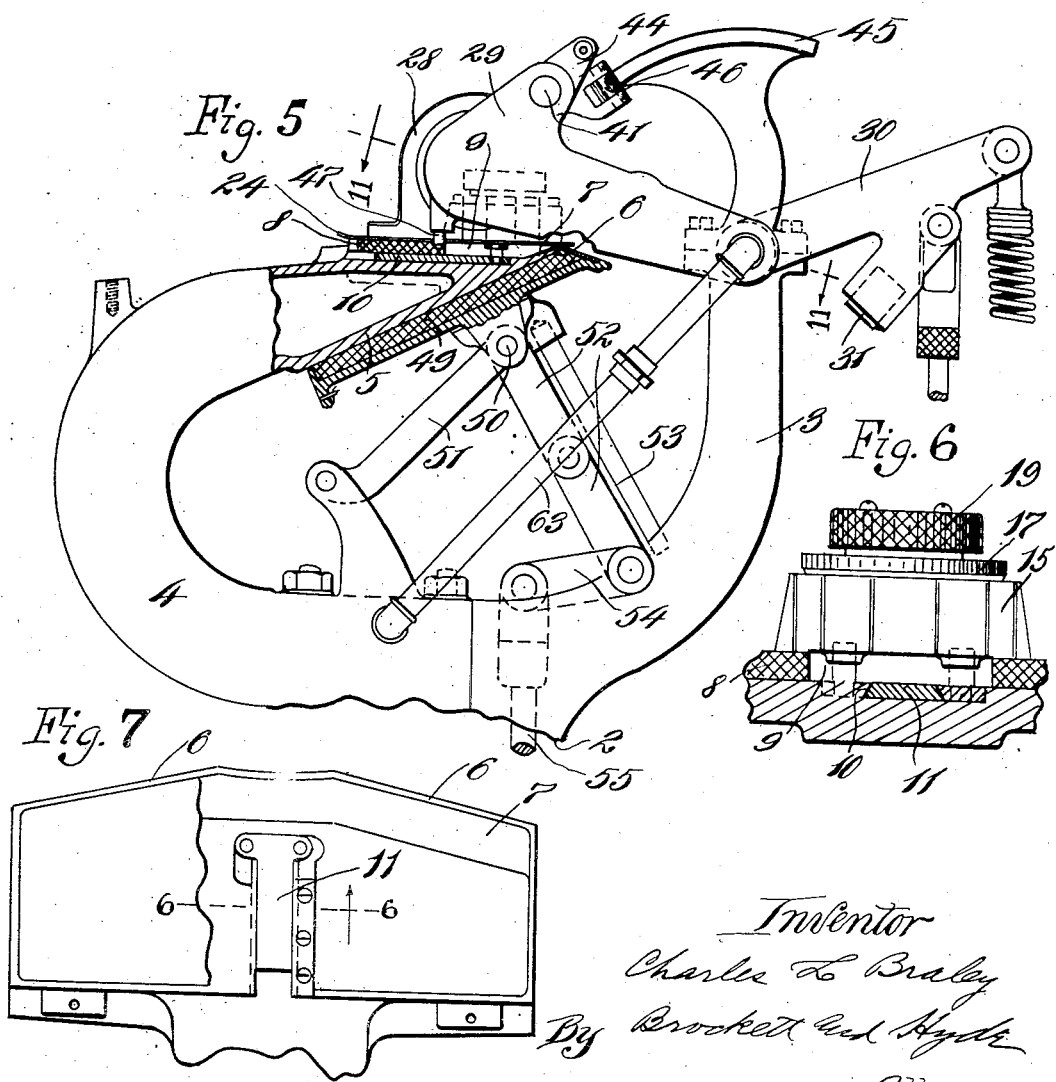
Inventor
Charles L. Braley
By Brockett and Hyde
Attys.

C. L. BRALEY.
SHIRT PRESSING MACHINE.
APPLICATION FILED DEC. 8, 1916.

1,403,838.

Patented Jan. 17, 1922.
5 SHEETS—SHEET 3.

Inventor
Charles L. Braley
Brockett and Hyde
Attys.

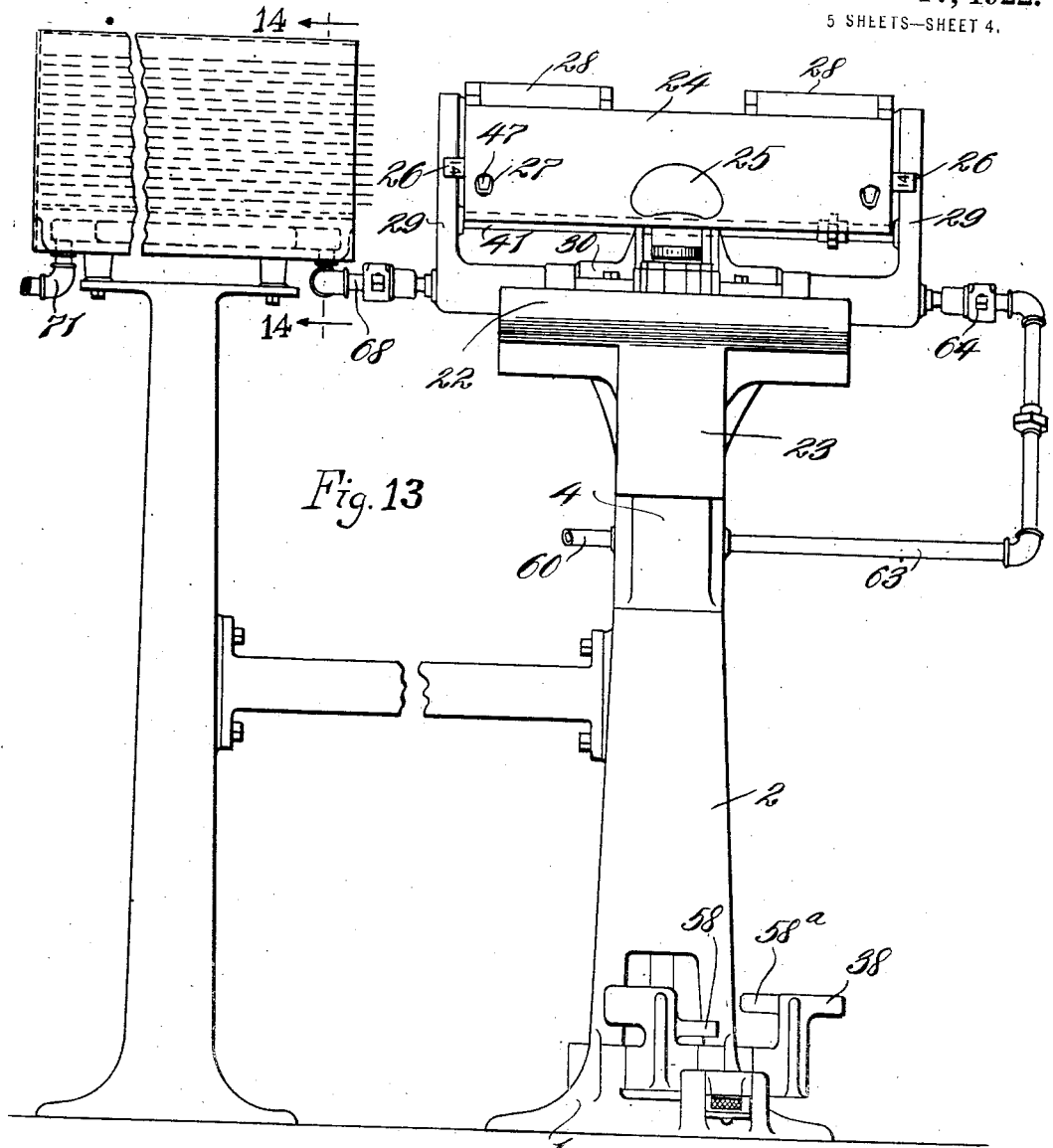

C. L. BRALEY.
SHIRT PRESSING MACHINE.
APPLICATION FILED DEC. 8, 1916.

1,403,838.

Patented Jan. 17, 1922.
5 SHEETS—SHEET 5.

Inventor
Charles L. Braley
By Brockett and Hyde
Attys.

UNITED STATES PATENT OFFICE.

CHARLES L. BRALEY, OF CINCINNATI, OHIO, ASSIGNOR TO THE AMERICAN LAUNDRY MACHINERY COMPANY, OF CINCINNATI, OHIO, A CORPORATION OF OHIO.

SHIRT-PRESSING MACHINE.

1,403,838.

Specification of Letters Patent.  Patented Jan. 17, 1922.

Application filed December 8, 1916. Serial No. 135,810.

*To all whom it may concern:*

Be it known that I, CHARLES L. BRALEY, citizen of the United States, residing at Cincinnati, in the county of Hamilton and State of Ohio, have invented certain new and useful Improvements in Shirt-Pressing Machines, of which the following is a specification.

This invention relates to shirt pressing machines, and more particularly to machines for pressing what are known as "stock" shirts. The machine is intended for use in carrying out the method of my prior application for method of pressing shirts, filed October 9, 1916, Serial No. 124,585. In the practice of said method the shirt is dressed on a form with the neck band surrounding a former, and while on said form the front portions of the yoke at the sides of the neck band are arranged and pressed. The back portions of the yoke are then arranged and pressed beneath the form, thereby establishing a folding line touching or tangent to the back of the neck band and fixing the "dress" or "set up" of the portions of the shirt adjacent the neck band. The shirt is then applied to another form properly shaped to fit the established "dress" or "set up," the pressed portions of the shirt are held in their established positions and the bosom is stretched and pressed to final form.

The present invention has relation to the machine for pressing those portions of the shirt adjacent the neck band, including the back of the yoke, to fix the folding line and establish the "dress" or "set up" of the shirt.

The object of the invention is to provide an improved shirt pressing machine whose form enables the folding line to be more sharply and definitely established in the shirt by the comparatively sharp edge or angle between its upper and lower pressing faces; whose neck band former is adjustable bodily on the bed or form to enable the folding line to be established at any desired point and to also compensate for variations in the size of neck band in different shirts; whose neck band former sections are adjustable substantially radially outwardly in all directions and overlap the padding to satisfactorily press various sizes of shirt; which is provided with a plurality of separate pressing plates, one or more for each size of shirt, which may be cut to accurately fit the shape of neck band adopted by each distinct manufacturer and enable shirts with slight variations in lines or style to be satisfactorily pressed close to the neck band on the same machine; whose upper and lower pressing members are independently operable, enabling the operator to clamp or press the front of the shirt before finally arranging the back of the shirt; whose operating mechanism is of simple form capable of producing maximum pressure with minimum effort; and finally a machine which is improved in many of its details, is strong and substantial, and which is not liable to get out of order in service.

Further objects of the invention are in part obvious and in part will appear more in detail hereinafter.

The invention comprises the shirt pressing machine hereinafter described and claimed.

Figure 9:
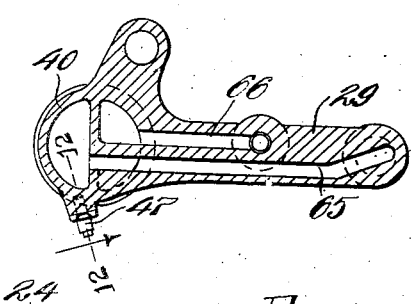
Figure 10:
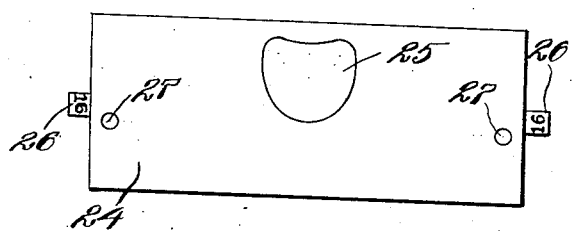
Figure 11:
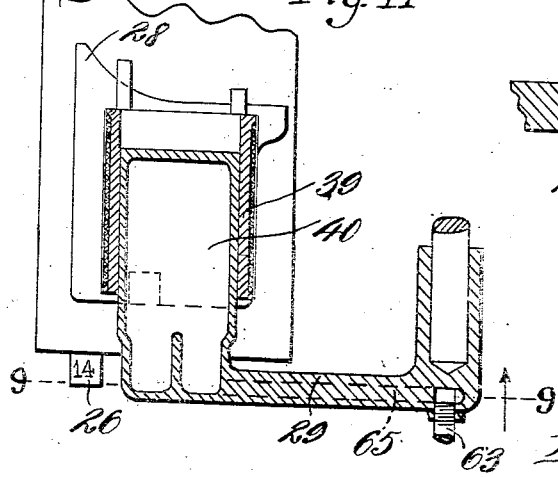
Figure 12:
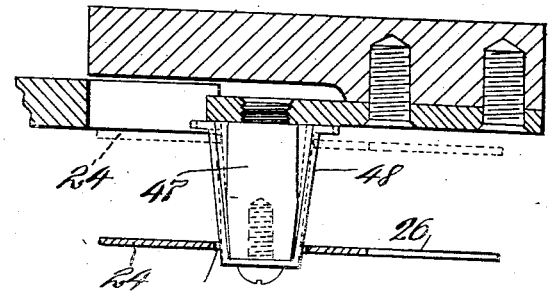
Figure 15:
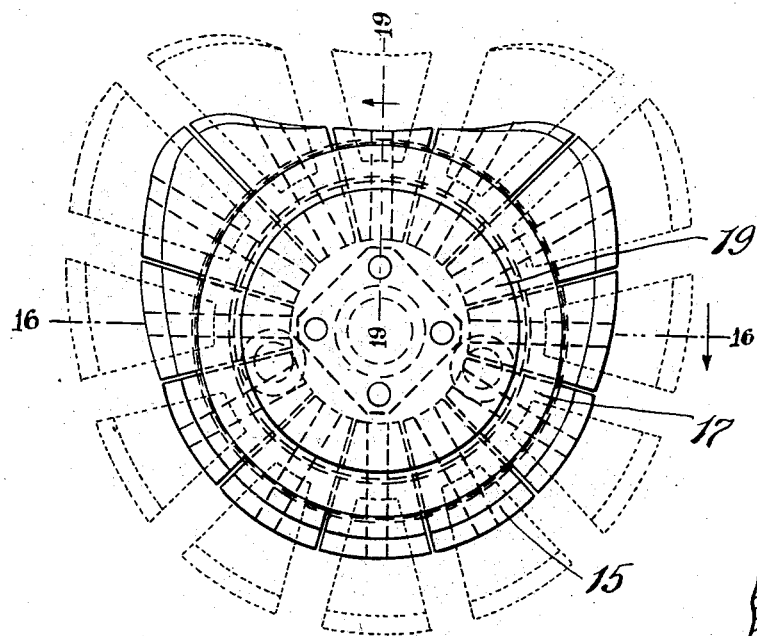
Figure 19:
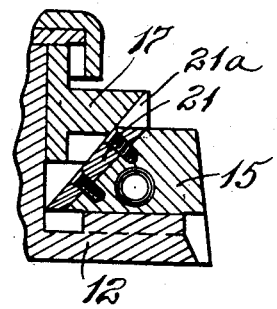
Figure 16:
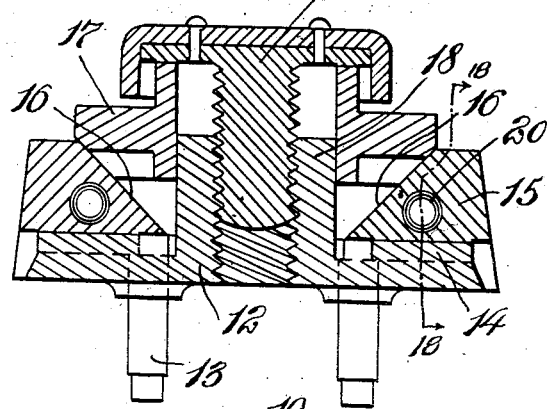
Figure 18:
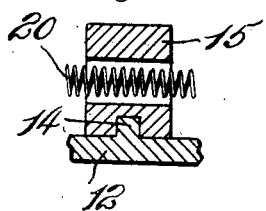
Figure 17:
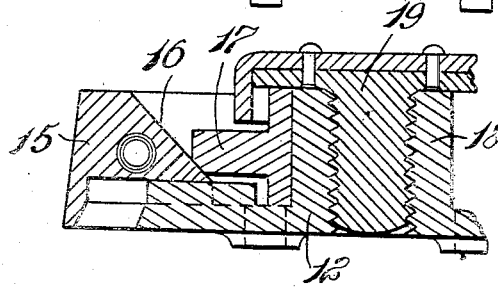

In the drawings, which represent one embodiment of the invention, Fig. 1 is a side elevation showing the pressing members out of cooperative pressing relation with the form or bed; Fig. 2 is a plan view of the upper portion of a stock shirt to be pressed; Fig. 3 is a plan view partly broken out, showing the upper or pressing face of the lower pressing member; Fig. 4 is a plan view of the neck band former; Fig. 5 is a side elevation, partly broken out and in section, showing the pressing members in pressing relation with the bed; Fig. 6 is a detail section, partly in elevation, showing the neck band former and its connection to the bed, the section being taken on the line 6—6, Fig. 7; Fig. 7 is a plan view, partly broken out, of the upper surface of the bed or former; Fig. 8 is a plan view of the machine; Fig. 9 is a detail section on the line 9—9, Fig. 11; Fig. 10 is a plan view of a pressing plate; Fig. 11 is a detail section on the line 11, Fig. 5; Fig. 12 is a cross section on the line 12—12, Fig. 9, showing one of the plate holding pins; Fig. 13 is a front elevation of the machine including the plate heater; Fig. 14 is a sectional elevation of the heater on the line 14—14, Fig. 13; Fig. 15 is a plan view, on a larger scale, of the neck band former; Fig. 16 is a cross section thereof on the line 16—16, Fig. 15; Fig. 17 is a similar view showing the segments adjusted outwardly; Fig. 18 is a detail cross section on the line 18—18, Fig. 16; and Fig. 19 is a detail section illustrating a modification.

The machine shown in the drawings comprises a suitable frame having a flat base 1 resting on the floor or other support, a pedestal 2, a rear standard 3 and a curved front standard 4. The end portion of the front standard is extended laterally in both directions and serves as the bed or former on which the shirt is dressed and pressed. Its lower face 5 is inclined relative to its upper face at a sharp or acute angle, as shown in Fig. 5, the two faces meeting along a comparatively sharp edge 6 which slopes away from the center toward either side of the bed, as shown in Fig. 7, along symmetrically disposed lines of equal inclination. This edge of the bed forms or establishes the line of fold at the shoulders of the shirt. The end of the bed terminates in a lip 7 extending upwardly with the lower face 5 above the upper face of the bed, thereby forming a shallow cavity or recess for the padding 8 whose upper surface is flush with the end edge of the bed. The padding is provided at its center with a longitudinal slot 9 below which the bed is provided with longitudinal undercut guideways 10 for a slide 11 which supports the neck band former. This former may be of any suitable form and shape, but is shown as of the form described and claimed in my copending application filed Dec. 8, 1916, Serial No. 135,811.

Briefly described, the neck band former comprises a central body 12 having downwardly extending pins 13 removably fitting openings in the slide 11. Said body also has a plurality of radially extending seats or guides 14 for the former segments 15 whose inner upper faces are beveled, as at 16, to cooperate with the inclined faces of a wedge member 17 slidable vertically on a shank 18 of the body. In said shank is threaded an adjusting cap or head 19 which bears down on the wedge and by means of which said wedge may be depressed to expand the segments and increase the size of the former. The segments are provided with alined openings forming a circumferential channel in which is located a spiral tension spring 20 which holds the segments in against the wedge. The wedge may be held against rotation in any suitable manner, for example, by ribs 21 on the segments of the former which work in guiding grooves 21ª in the wedge, as shown in Fig. 19, although this is not essential.

The edges of the former segments extend outwardly over the padding, as shown in Fig. 6, so as to overlie the same in all positions and adjustments of the former. The segments are also movable radially outwardly in all directions so that the neck band size is uniformly varied without material change in shape or proportions, as shown by the dotted lines A, Fig. 2. The shirt is dressed on the bed by applying the shirt collar to the former adjusted to the proper size, sliding said former along the bed until the back of the neck band is tangent to or touching the folding line and then arranging the portions of the yoke at the sides of the neck band on the padding in proper position for pressing. The neck band former is adjusted for size and in its position on the bed only when a change is made in the size of shirt being pressed on the machine. Beyond the pressing area of the bed the standard may be provided with a table 22 and depending guard 23 which support the bosom and front shirt-tail and prevent them from dropping into contact with working parts of the machine.

Upon the shirt, dressed on the bed as described, is laid a pressing plate 24, which is a flat thin metal sheet having an opening 25 near its center to receive the neck band former so that the plate fits down close around the neck band and lies flat on the shirt. Each manufacturer may have his own individual style and shape of neck band cut according to his own patterns. The neck band former will be shaped to correspond to said pattern and the opening in the pressing plate cut to exactly fit the former. There will be several plates, one or more for each size of shirt, each of which will have one or more tabs or projections 26 thereon marked with the proper shirt size to distinguish them. Each plate is also provided with two oppositely disposed small holes or perforations 27, located beyond the pressing area, for a purpose which will appear.

Pressure is applied to the pressing plate for pressing the yoke portions of the shirt by two pressing members 28 carried by arms 29 on a frame 30 pivoted on the standard 3. Said frame is normally held in its elevated position, shown in Fig. 1, with its bumper 31 against the standard, by a tension spring 32 and is swung downward to bring the pressing members into pressing relation with the bed by closing the toggle links 33, 34. Link 33 is suitably adjustable as to length to vary the effective pressure in the final pressing position, while link 34 is slotted at 35 to receive a member, such as a roller 36 on an arm 37 of a bell crank lever whose other arm 38 is formed as a foot treadle for actuation by the operator.

Each pressing member 28 has a body 39 in the form of a hollow sleeve surrounding and slidable longitudinally of a laterally extending hollow cylindrical member 40 carried by one of the arms 29. Said arms 29 are connected by a cross rod 41 which passes freely through perforated ears 42 on the bodies, thereby permitting said pressing members to move longitudinally on the tubes 40, but without turning movement thereon. The pressing members are moved toward each other by a tension spring 43 attached to ears 44 thereon and are separated by a cam 45 in the form of a double wedge located at the center of the machine and along the inclined edges of which travel rollers 46 on the pressing members.

With the arrangement described the pressing members approach each other as the frame 30 is swung downward toward the bed and come in toward the neck band former from the side, thereby automatically adjusting themselves to the neck band former, whatever be it adjustment or position. In the final pressing position said pressing members press down upon the pressing plate which distributes the pressure over the yoke and presses the same effectively clear up to the neck band. The pressing results are unaffected by variations in neck band size or shape due to the automatic adjustment of the pressing members to the neck band former and the accurate fit of the neck band former in the pressing plate opening.

Each tubular support 40 is provided on its lower surface with a downwardly extending projection 47 having spring walls 48 secured thereto. These spring projections are on parts which move together and consequently are maintained in fixed spaced relation. They are located at the same distance apart as the holes 27 in the pressing plates. The first downward movement of the press pushes the projections through said openings until the plate reaches the dotted line position Fig. 12, in which position it is yieldingly held on said pins. During subsequent press movement the plate travels with the swinging head relieving the operator of the necessity of lifting it from the shirt when changing work. The plate need be removed only when required by a change in the size of shirt operated upon.

While pressure is effective through pressing members 28 on the front of the shirt, the back of the shirt is pulled out straight and properly arranged beneath the bed ready for the operation of the lower pressing member 49. The latter is a padded plate conforming to the under surface of the bed and extending clear up to the folding line when in pressing position so as to cooperate with the bed and upper pressing plate in creasing or folding the garment at the folding line. The lower pressing member is hinged at 50 to an arm or arms 51 pivoted on the main frame and is also pivotally connected to a pair of toggle links 52 which when straightened move the pressing member up to the bed. The movement of the pressing member is substantially a straight advancing movement toward the bed which it engages simultaneously at all points, pressing the back of the garment down to the dotted line B, Fig. 2. This parallel or straight movement is produced by a tail rod 53 attached to the pressing member and which slides in a hole in the frame. The toggle links 52 are straightened by an arm 54 connected to the shaft supporting one of said links, and which arm is oscillated by a link 55 connected to a foot treadle 56.

The operation of the lower pressing member completes the duty of this press, which is then opened or released to dress a new shirt thereon by depressing the release treadle 57 which engages arm 58, 58$^a$ on the two pressure treadles and breaks both toggles.

The lower pressing member is not heated but merely carries a pad 49 which is pressed against the shirt. The stationary bed and upper pressing members are, however, heated. For this purpose the machine is provided with a steam supply pipe 60 which supplies steam to the lower channel 61 of the front standard through which it flows to the pressing portion of the bed, thereby heating both its upper and lower pressing surfaces. The steam then flows through a return channel 62 to a pipe 63 which conducts it through a swivel connection 64 on the axis of turning movement of the frame 30 to a passage 65 through one of the arms 29 leading to the interior of the hollow cylindrical support 40, thereby heating the same and also the body of the pressing member 28 carried thereby. The steam returns through a channel 66 to a pipe 67 extending across to the other arm 29 which is provided with similar channels for circulating the steam through its tubular support, and finally issues through the swivel connection to the pipe 68.

Preferably each machine is provided with a heater attachment such as shown in Figs. 13 and 14, which not only utilizes the otherwise waste steam but also keeps the reserve pressing plates heated ready for use when required. This heater is merely a hollow box having shelves or ledges 69 to receive the various pressing plates, said box being open on one side for inserting or withdrawing the plates. The size tabs on the plates may be located at different places according to size, as shown in Fig. 14 to readily distinguish the different plates. The bottom of the heater is a metal casting having a circuitous passage 70 therein through which steam is circulated from the pressing machine, being finally discharged at 71.

The shirt pressed on this machine is removed therefrom and its established dress or set up is utilized in arranging it upon another machine for pressing the shirt bosom. The machine is of simple form and is easily manipulated. It can be adapted readily to variations in style or size of shirt and produces work of high quality.

What I claim is:—

1. A pressing machine, comprising a bed having upper and lower pressing surfaces, pressing members cooperating with said surfaces, means for independently actuating said members, and a single means for releasing said members.

2. A pressing machine, comprising a bed, a neck band former guided in and bodily adjustable along said bed, and a pressing member cooperating with said bed.

3. A pressing machine, comprising a bed, a neck band former adjustable to various sizes, guided in and bodily adjustable along said bed, and a pressing member cooperating with said bed.

4. A pressing machine, comprising a bed, having upper and lower pressing surfaces meeting at an edge, and a neck band former adjustable bodily relative to said edge.

5. A pressing machine, comprising a bed, having upper and lower pressing surfaces meeting at an edge, a neck band former adjustable bodily relative to said edge, and pressing members cooperating with said surfaces.

6. A pressing machine, comprising a bed, a neck band former adjustable bodily on said bed, and pressing members cooperating with said bed and adapted to automatically adjust themselves to the neck band former.

7. A pressing machine, comprising a bed, a neckband former adjustable as to size and also bodily adjustable on said bed, and pressing members cooperating with said bed and adapted to automatically adjust themselves to the neck band former.

8. A garment pressing machine, comprising a bed, a neckband former, a pressing plate having an opening of the size and shape of the neckband former, said plate being adapted to completely surround the former and covering a portion of the garment, and means for applying pressure to said plate.

9. A garment pressing machine, comprising a bed, a neckband former, a self contained pressing plate fitting and surrounding said neckband former and lying over a portion of a garment on the bed, a pressing member movable into co-operating pressing relation with said plate, and inter-engaging parts on said pressing member and plate adapted to be engaged by pressing movement of said pressing member thereby to detachably connect said pressing member and plate.

10. A garment pressing machine, comprising a bed, a neck band former, a self contained pressing plate completely fitting and surrounding said neck band former and lying over a portion of the garment, said plate having a pin opening therein, a pressing member movable into cooperating relation with said plate, and a pin connected to said member and adapted to enter said opening in said plate and in proper relation thereto.

11. A pressing machine, comprising a bed, a pressing plate cooperating therewith, and a swinging frame having arms, means detachably connecting said plate to said arms, and relatively movable pressing members cooperating with said bed and supported by said arms.

12. A pressing machine, comprising a bed, a pressing plate cooperating therewith, a swinging frame having arms, and quick detachable connecting means between said plate and arms, said means being so arranged that when connected the plate is supported by and swings with said arms.

In testimony whereof I affix my signature.

CHARLES L. BRALEY.